July 1, 1930.  J. FIEUX  1,769,736

BALL BEARING FOR SHAFTS

Filed Sept. 17, 1928

Inventor
Jean Fieux
By Cameron, Kerkam & Sutton
Attorneys

Patented July 1, 1930

1,769,736

UNITED STATES PATENT OFFICE

JEAN FIEUX, OF PARIS, FRANCE, ASSIGNOR OF ONE-HALF TO SCHNEIDER & CIE., OF PARIS, FRANCE, A LIMITED JOINT STOCK COMPANY OF FRANCE

BALL BEARING FOR SHAFTS

Application filed September 17, 1928, Serial No. 306,575, and in France October 3, 1927.

The present invention relates to means enabling juxtaposed roller bearings to be constructed for heavily loaded shafts, and more particularly for the rotors of anti-rolling gyroscopes.

It is known that, notwithstanding the care taken in the manufacture of ball and roller bearings, the rolling paths of the race often present an eccentricity of several hundredths of a millimetre. From this there results the well-known difficulty experienced in constructing bearings with a plurality of roller paths with a view to distributing the load in a suitable manner.

This difficulty is generally evaded by merely utilizing two roller paths mounted on the same trunnion at a certain distance apart and resting in the same sleeve, the latter being capable of oscillating in the body of the bearing. This arrangement, however, leads to a weight and size which are not always acceptable.

Moreover, when several roller paths are juxtaposed they only present a comparatively small total radiation surface and can only give up their heat by conduction. Natural cooling thereof is liable to be insufficient and may compromise the durability of the bearing.

To sum up, a double obstacle is met with in utilizing a plurality of juxtaposed roller bearings if an attempt is made to construct in practice a bearing with multiple roller paths.

According to the present invention this double difficulty is overcome by the following means:

The external races of the juxtaposed roller bearings each rest, through the medium of a cell or socket and of slide shoes appropriate thereto, upon a common bearer, consisting of plastic and practically incompressible material, such as india rubber, for example. This material being enclosed on all sides acts like a liquid under pressure. It opposes and suitably distributes reaction between the shoes of the cells, whatever may be the movements of the latter, which is comparable to that of an eccentric.

To the device for compensating for eccentricity is added a ventilating device consisting of a fan wheel causing air to circulate in the spaces left open between the roller paths, the fan wheel being mounted behind one of the end bearings. The air set in motion may moreover carry and distribute the oil, which is brought by a lubricator to the entrance of the bearing, the cooling and lubrication of the various parts being thus ensured simultaneously and in a rational manner.

The invention is illustrated in the accompanying drawings as applied by way of example to an anti-rolling gyroscope bearing.

Figure 1:
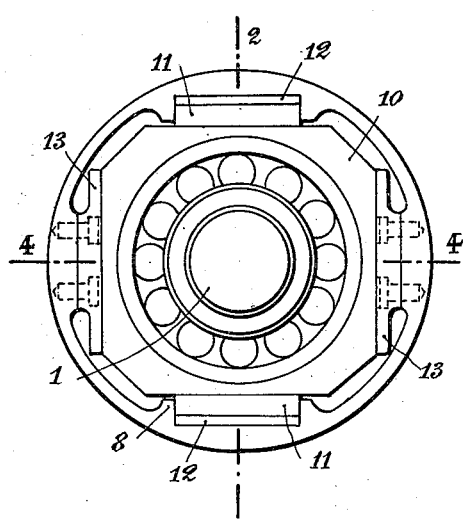
Figure 1 is an end view of the bearing.
Figure 2:
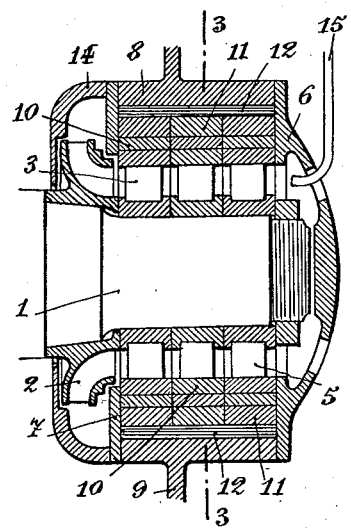
Figure 2 is an axial section in the plane of the heaviest loads that is to say, on line 2—2 in Figure 1.
Figure 3:
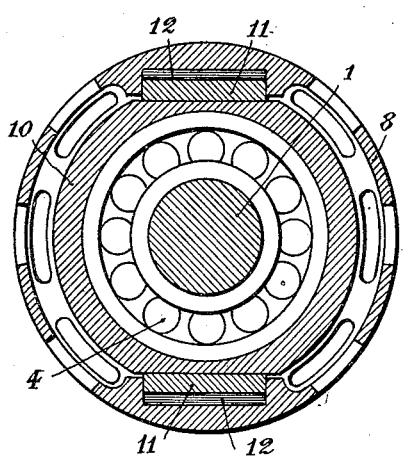
Figure 3 is a transverse section on the line 3—3 in Figure 2.
Figure 4:
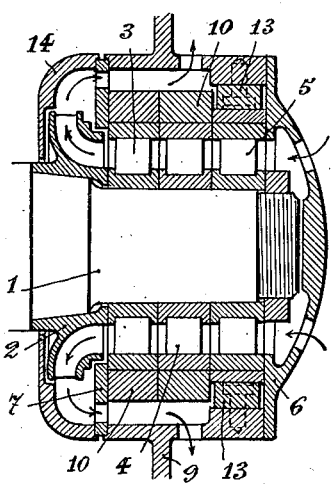
Figure 4 is an axial section on a plane perpendicular to the plane of section of Figure 2, that is to say on the line 4—4 in Figure 1.

On a shaft 1 are mounted and gripped firmly one against the other a ventilating wheel 2 and the inner races of the roller bearings 3, 4 and 5 of which the outer races are held without being gripped between cheeks 6 and 7 of the bearing 8, which are virtually integral with the gear casing 9. The outer races of the bearings are lodged in cells 10 which are provided with flat faces diametrically opposite to one another, by which the said cells make contact with shoes 11, which in their turn bear upon a plastic material 12 forming a bearer common to each group of shoes.

This material, which may be vulcanized india-rubber, is contained in a cavity enclosed on all sides by the body of the bearing 8, the cheeks 6 and 7 and the shoes 11 which are adjacent to one another but can shift freely in relation to one another within the frame of the cavity receiving the plastic bearer.

The cell of the outer race of the bearing 5 carries two supplementary flats perpendicular to the former by which it is guided between slippers 13 fixed to the body of the bearing. The cells of the outer races of the roller paths 3 and 4 on the contrary, not being held laterally, can slide freely over their shoes.

The body 8 and the cheeks 6 and 7 of the bearing comprise orifices for the passage of the cooling air discharged from the casing 9 by a deflector 14. A drip lubricator 15 is placed at the entrance of the bearing. The lubricant is carried by the air across the roller paths.

I claim:

1. In a multiple roller bearing, the combination of a plurality of inner and outer races, annular mountings for the outer races provided with diametrically opposite flat faces, slide shoes contacting with each of said flat faces, two bodies of incompressible plastic material one on either side and against which said slide shoes rest, and means completely confining said bodies of incompressible material.

2. In a multiple roller bearing, a bearing casing comprising an annular shell and oppositely disposed end members, multiple pairs of inner and outer races within said casing, independent juxtaposed cells within which the outer races are mounted, and two diametrically opposed independent bodies of incompressible plastic material confined within the casing and between the casing and said cells.

3. In a multiple roller bearing, the combination of a casing, two independent bodies of diametrically opposed incompressible plastic material confined therein, a plurality of independent cells supported between said two bodies, an outer race carried by each of said cells, and an inner race corresponding to each outer race.

4. In a multiple roller bearing, the combination of a bearing casing comprising an annular shell having an exit port, multiple pairs of inner and outer races supported in said casing, independent juxtaposed cells within which the outer races are mounted, two diametrically opposed independent bodies of incompressible plastic material confined within the casing and between the shell of the casing and said cells, and two oppositely disposed end closures for said casing, one of said end closures having a port leading into the space betwen the inner and outer raceways and the other end closure having a channel connecting said space with the exit port of said casing, whereby said bearing may be lubricated.

In testimony whereof I have signed this specification.

JEAN FIEUX.